US006006999A

United States Patent [19]

Tiessen et al.

[11] Patent Number: 6,006,999

[45] Date of Patent: Dec. 28, 1999

[54] AIR KNIFE BLOW-OFF FOR MAINTAINING CLEANLINESS OF ROTARY POWDER APPLICATIONS

[75] Inventors: David A. Tiessen, Cottam; Danny Baioff, Tecumseh, both of Canada

[73] Assignee: Chrysler Corporation, Auburn Hills, Mich.

[21] Appl. No.: 09/083,903

[22] Filed: May 22, 1998

Related U.S. Application Data

[60] Provisional application No. 60/076,429, Feb. 27, 1998.

[51] Int. Cl.[6] .......... A01G 23/10; B05B 17/04

[52] U.S. Cl. .......... 239/3; 239/7; 239/112; 239/223; 239/700

[58] Field of Search .......... 239/3, 7, 106, 239/690, 223, 224, 112, 700; 15/316.1

[56] References Cited

U.S. PATENT DOCUMENTS

| | | | |
|---|---|---|---|
| 4,285,446 | 8/1981 | Rapp et al. | 222/70 |
| 4,572,437 | 2/1986 | Huber et al. | 239/703 |
| 4,979,677 | 12/1990 | Dankert | 239/105 |
| 5,529,246 | 6/1996 | Saito et al. | 239/702 |
| 5,735,434 | 4/1998 | Rayner | 222/1 |

FOREIGN PATENT DOCUMENTS

| | | | |
|---|---|---|---|
| 76-03654 | 10/1976 | France | 239/112 |
| 406320061A | 11/1994 | Japan | 239/112 |

*Primary Examiner*—Andres Kashnikow
*Assistant Examiner*—Jorge Bocanegra
*Attorney, Agent, or Firm*—James R. Yee

[57] ABSTRACT

An apparatus for reducing undesirable powder accumulation on an electrostatic powder coating device is provided. The apparatus includes a pneumatic source for generating a pneumatic supply. The pneumatic supply is received and distributed by a pneumatic distribution device which provides the pneumatic supply to a pneumatic diffuser. The pneumatic diffuser directs a pneumatic stream at the electrostatic coating device such that undesirable powder accumulation on the electrostatic powder coating device is reduced.

20 Claims, 3 Drawing Sheets

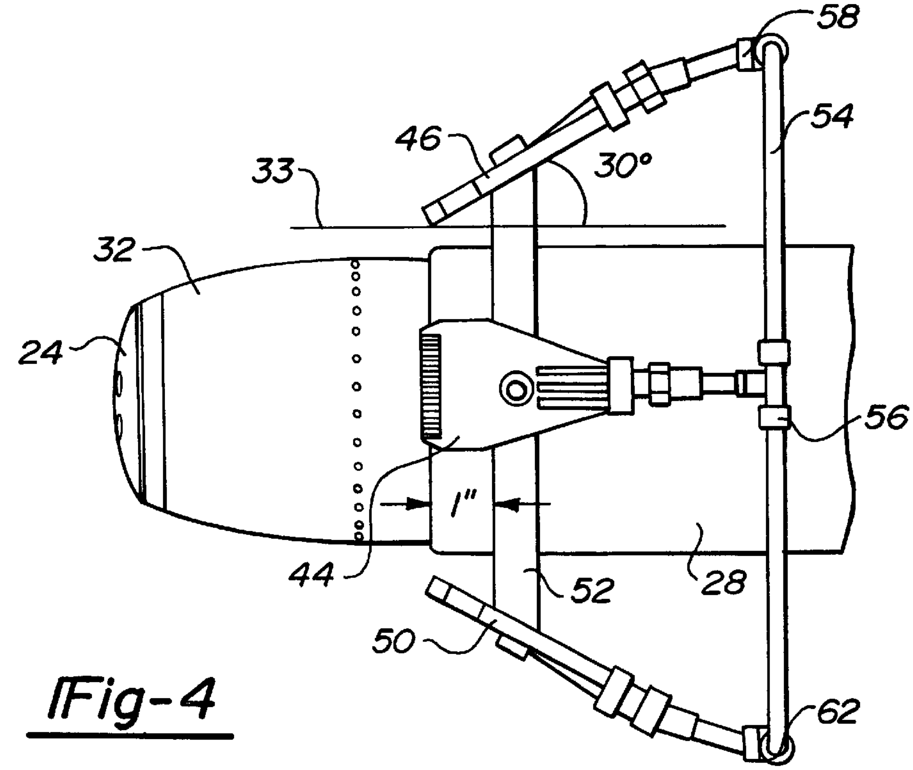
IFig-4
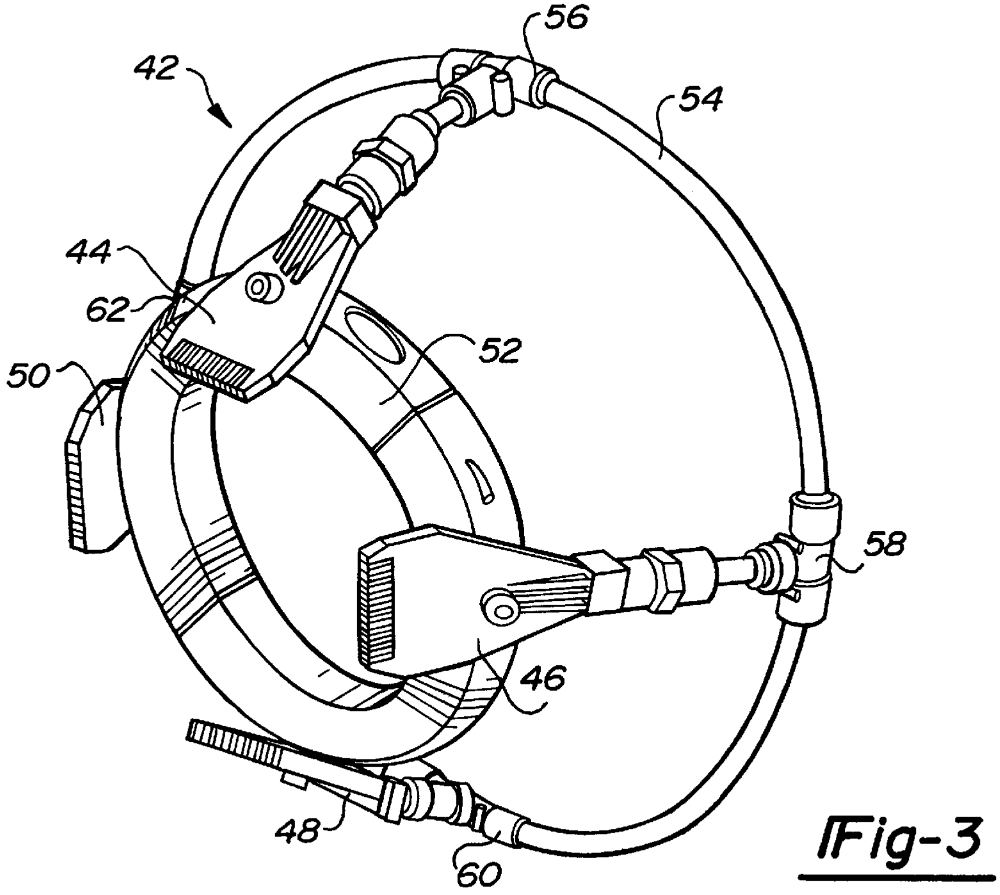
IFig-3

AIR KNIFE BLOW-OFF FOR MAINTAINING CLEANLINESS OF ROTARY POWDER APPLICATIONS

CROSS REFERENCE TO RELATED APPLICATIONS

This is a conventional application based on a provisional application filed Feb. 27, 1998 and assigned U.S. Ser. No. 60/076,429.

BACKGROUND OF THE INVENTION

1. Technical Field

The present invention generally relates to electrostatic paint application devices, and more particularly to an apparatus and method for reducing undesirable powder accumulation on electrostatic paint devices.

2. Description of Related Art

Electrostatic powder coating is routinely used in industry to coat an object with a paint that is applied in powder form. After the object is coated with a sufficient layer of powder, it is routed to an oven for the application of heat, which converts the powder coating into a homogeneous and strong paint layer as a result of the powder particles melting together, including polymerization.

Electrostatic paint application devices are used to apply powder paint. These devices typically use a rotating cup to disperse powder into a compressed air stream which is directed toward the target, in this case, an automotive body-in-white (an unpainted unadorned metal body). The face of the rotating cup typically has a metal plate, which, when electrically charged creates a corona field. This field is attracted to the closest electrical ground which is, not coincidentally, the automotive body-in-white, which is intentionally given an electric charge.

As powder particles are propelled by air, they pass through the corona field, where they accumulate charged ions. This effectively charges the paint particles. These charged paint particles are then physically, by means of the compressed air stream, and electrically, by means of the difference in charge, propelled to the surface of the body-in-white. However, not all paint particles acquire a charge for a variety of reasons, such as thermal and aerodynamic effects. Some particles thus do not make it to the body in white surface. This is typically referred to as stray powder.

Stray powder can, if not properly controlled, accumulate on the surface of the powder applicator. This powder may accumulate in large quantities and subsequently fall on the rotary bell cap and then onto the coated surface, causing undesirable paint defects. These defects typically require a manual sanding operation in order to remove them prior to application of a top coat (color and/or clear coat). The sanding of these defects generates contaminants, which can be extremely harmful to the appearance of the top coated article, as well as requiring significant labor and expenses. The powder accumulation on surfaces other than the object to be painted also causes numerous production interruptions to allow maintenance personnel to remove the undesired powder deposits, resulting in the reduction of production rates.

Known methods for cleaning the powder applicators described above generally require shutting down the system, manually applying low pressure air, and wiping applicable surfaces with rags to remove the deposits.

In view of the foregoing, it is one objective of the present invention to provide an apparatus and method for reducing undesirable powder accumulation on a powder application device.

It is an additional objective of the present invention to provide an apparatus and method for reducing undesirable powder accumulation on a powder applicator device which is easily assembled and installed.

Additional advantages and features of the present invention will become apparent from the subsequent description and claims taken in conjunction with the accompanying drawings.

SUMMARY OF THE INVENTION

In accordance with the teachings of the present invention, an apparatus for removing powder accumulation is provided. The device uses system compressed air to periodically blow off accumulated stray powder. The present invention comprises a plurality of pneumatic or arm diffusers mounted to an annular ring attached to the spring applicator device. System software activates cleaning cycles in accordance with the present invention.

BRIEF DESCRIPTION OF THE DRAWINGS

Other objects and advantages of the invention will become apparent upon reading the following detailed description and upon reference to the following drawings, in which:

FIG. 3 is the apparatus of the present invention shown without the powder coating spray bell;

FIG. 4 is a side view of the spray gun and apparatus of the present invention.

DETAILED DESCRIPTION OF THE PREFERRED EMBODIMENT

Figure 1:
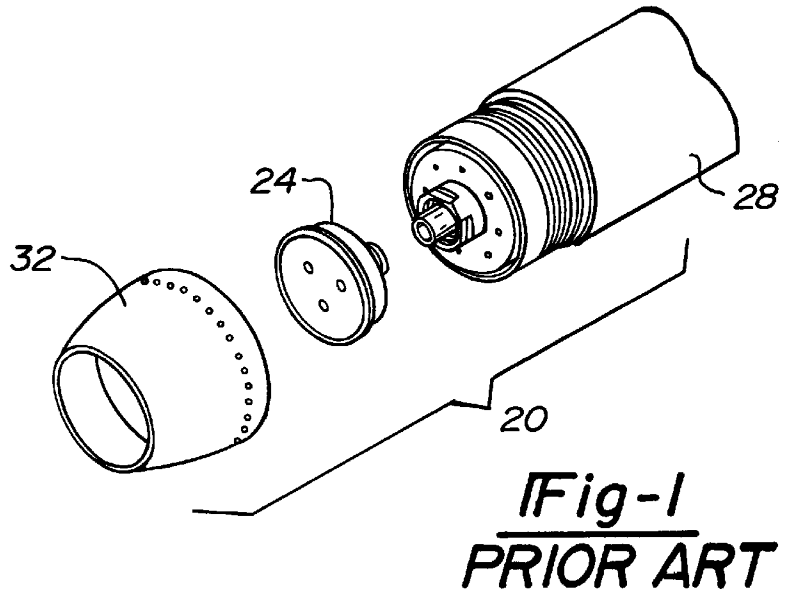
Fig-1 PRIOR ART
FIG. 1 is an exploded view of a rotary, electrostatic powder coating spray bell of the prior art.

Turning first to FIG. 1, an exploded view of a powder coating spray bell 20 that is designed for use in automated powder coating stations is shown. The illustrated spray bell 20 is based on a model SRV 038 spray bell, manufactured by Sames Corporation. However, it should be readily understood that the invention is readily applicable to any appropriate type of spray bell.

The spray bell 20 is a rotary, electrostatic powder coating spray bell. The spray bell 20 has an ionizing electrode (not shown) that electrically charges the powder paint as it proceeds from turbine body 28 to bell cup 24 to the object being painted (not shown). A turbulent airstream is created by air being applied to the system. In order to ensure that the powder adheres to the part being painted, the latter must be a good conductor (or semi-conductor) and properly grounded.

In the turbulent airstream, stray powder may seek the grounded surface of the paint applicator, including the shaping air ring 32. This stray powder can, if not properly controlled, accumulate in large quantities and subsequently fall on the bell cup 24, which may then disperse the accumulated powder onto the coated surface, producing a paint defect that requires additional processing steps, including sanding, to remove the defects prior to the application of a top coat.

Figure 2:
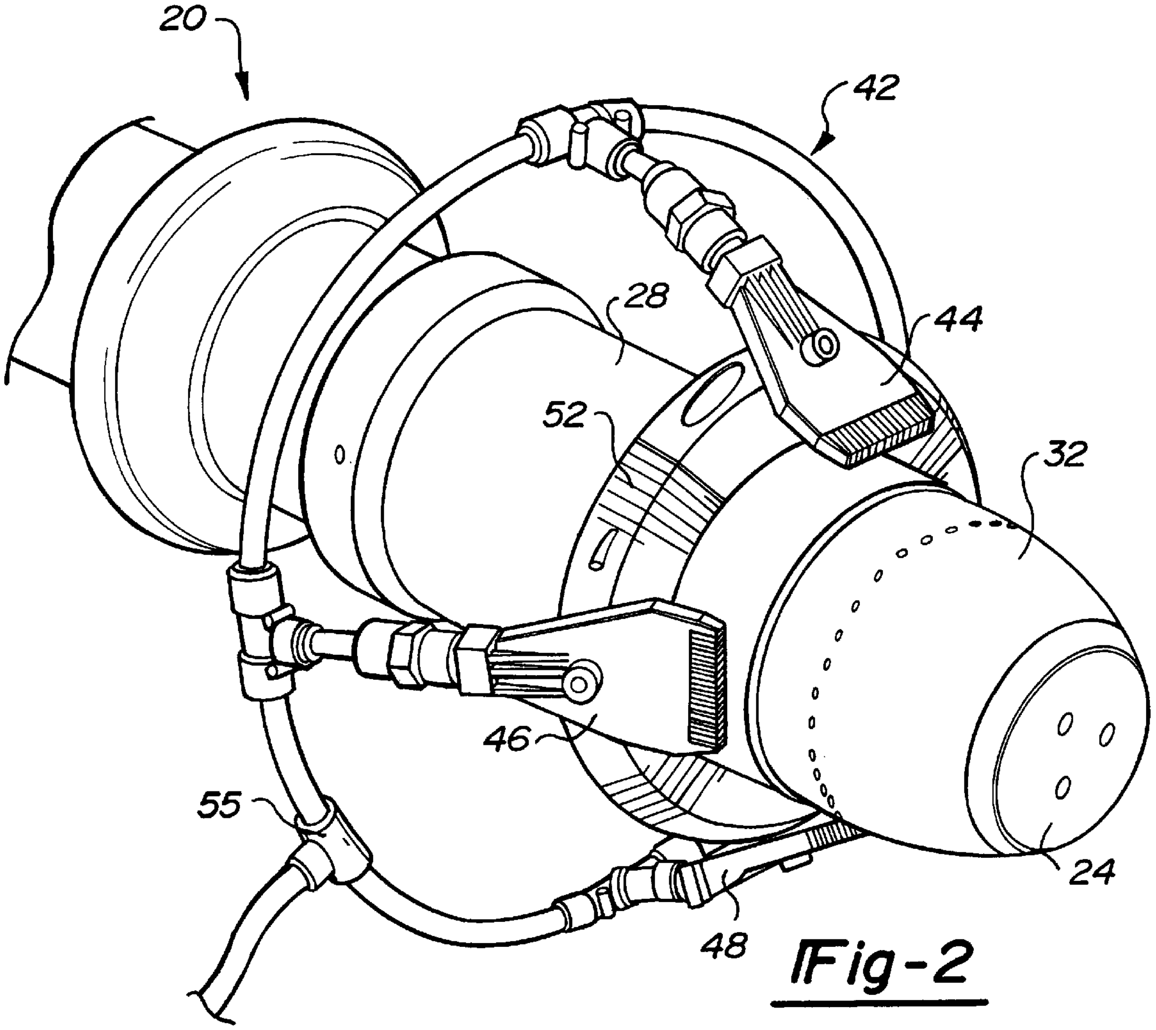
FIG. 2 is the apparatus of the present invention in use with the spray bell of FIG. 1.

FIG. 2 shows the spray bell 20 in use with apparatus for removing accumulated powder of the present invention 42, and FIG. 3 illustrates apparatus 42 separated from the spray bell. As can be seen in FIG. 3, the preferred embodiment of the present invention includes a plurality, and, more preferably, four pneumatic diffusers or air knives (44, 46, 48, 50) mounted at equal angles to a split annular ring 52 that is attached to the bell body 28. The air knives shown are 2" air jets manufactured by Winjet (part number 727-RY-15X 2"NPT male), but they may be any appropriate pneumatic diffuser type device.

Turning to FIG. 4, the split annular ring 52 preferably is recessed approximately 1" behind the shaping air ring 32 such that the front edges of the air knives (44, 46, 48, 50) are aligned with the edge of the shaping air ring 32 that abuts the bell body 28. The ring is preferably held in place over the bell body via a frictional engagement, but may be screw or bolted in place if desired. Furthermore, the split annular ring 52 is preferably beveled so that the air knives (44, 46, 48, 50) are placed at an angle of approximately 30 degrees in relation to an axis 33 that is parallel to the bell body 28 and shaping air ring 32, although any appropriate desired angle may be used. This maximizes the cleaning effect. It should be also readily understood that the position of the split annular ring 52 on the spray gun and the mounting angles of the air knives may be varied to produce similar results, depending on the result desired.

Referring again to FIG. 3, the air knives are supplied compressed air from a pneumatic distribution device that includes a plastic tubing ring 54 connected to a pneumatic source of compressed air with additional tubing that is connected to the tubing ring 54 via a connection T-joint 55. The pneumatic supply or compressed air received at the connection T-joint 55 is then distributed to the air knives (44, 46, 48, 50) via the tubing ring 54 and T-joints (56, 58, 60, 62).

Figure 5:
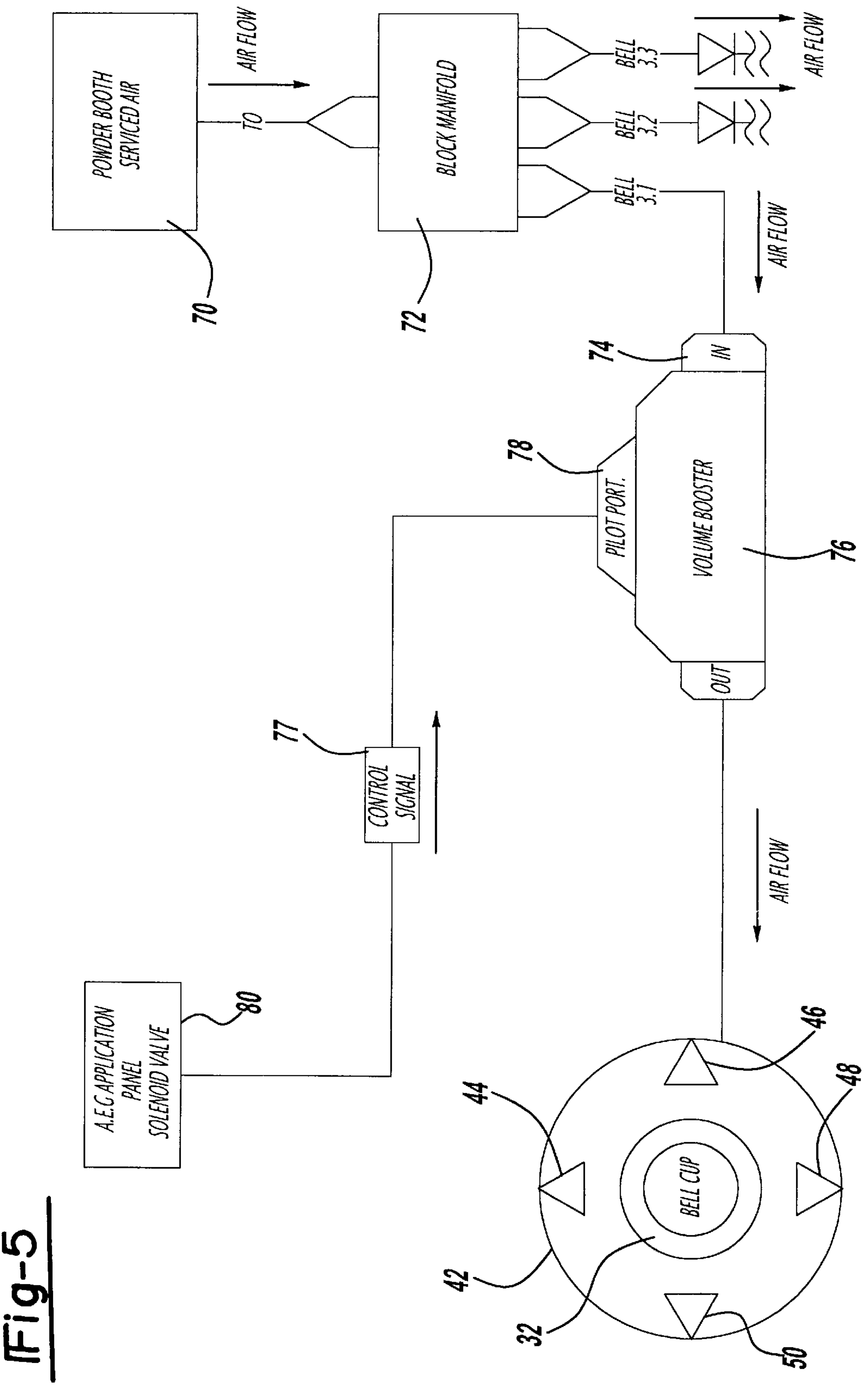
FIG. 5 is a schematic view of the apparatus of the present invention.

FIG. 5 shows a schematic view of the preferred embodiment of the apparatus of the present invention. As can be seen, compressed air from powder booth serviced air supply 70 is provided to a block manifold 72 that distributes the compressed air input port 74 of a volume booster 76, for each apparatus 42 that is being used in the system. This air also is used in the bell cups for powder applications. The volume booster 76 controls the supply of compressed air to apparatus 42 of the present invention based upon a control signal 77 that is provided to a pilot port 78 of the volume booster 76.

The control signal 77 is generated by a programmable logic controller (PLC) 80 located in the control panel controller, which in the preferred embodiment also controls the air flow to the powder application equipment. To cause apparatus 42 to operate to remove powder accumulation, the PLC 80 transmits the control signal 77 to pilot port 78 which causes air flow to be released through the volume booster 76, providing air to the air knives (44, 46, 48, 50). The PLC is programmed via paint system software to cause the apparatus of the present invention to activate at appropriate times in the powder coating operation so as not to interfere with the coating process.

As previously indicated, air passing through the air knives (44, 46, 48, 50) diffuses into a pattern which covers with air flow the deflector surface of the rotary powder paint applicator, thereby removing accumulated powder from the shaping air ring 32 that could otherwise fall on rotary bell cup and disperse to the object that is being painted. The presentation of compressed air across the surface of the applicator in an appropriate sequence can be accomplished between jobs or during the purge cycle which is used to clean the internal paint lines and equipment of the painting apparatus. In this fashion, additional interruptions to production are not introduced with the present invention, and interruptions due to accumulation produced defects are significantly reduced.

From the invention as described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for reducing undesirable powder accumulation on an electrostatic powder coating device, comprising:

a pneumatic distribution device for receiving and distributing a pneumatic supply;

a beveled annular ring coupled to said pneumatic distribution device: and a plurality of pneumatic diffusers coupled to said beveled annular ring so as to be disposed at an angle relative to said pneumatic distribution device, said plurality of pneumatic diffusers receiving said pneumatic supply from said pneumatic distribution device and directing a pneumatic stream at the electrostatic coating device such that powder accumulation on the electrostatic powder coating device is reduced.

2. The apparatus of claim 1 wherein said pneumatic supply is compressed air.

3. The apparatus of claim 1 wherein said pneumatic diffuser is an air knife.

4. The apparatus of claim 1 wherein a plurality of pneumatic diffusers receive said pneumatic supply and direct a plurality of streams at the electrostatic coating device.

5. The apparatus of claim 1 further comprising a volume booster that increases the pneumatic flow rate provided to said pneumatic distribution device.

6. The apparatus of claim 1 further comprising a controller that generates a signal that is utilized to control the application of said pneumatic supply to said pneumatic diffuser.

7. A method for reducing powder accumulation on a pneumatic electrostatic powder coating device comprising the steps of:

providing a pneumatic supply;

providing a plurality of pneumatic diffusers;

attaching said plurality of pneumatic diffusers to said electrostatic powder coating device with a beveled annular ring;

providing a manifold for receiving and distributing said pneumatic supply to said pneumatic diffusers; and directing the output of said pneumatic diffusers at the electrostatic coating device to reduce the powder accumulation on the electrostatic powder coating device.

8. The method of claim 7 further comprising the step of providing a volume booster between said manifold and said diffuser.

9. The method of claim 7 wherein said pneumatic supply is compressed air.

10. The method of claim 7 wherein said pneumatic diffuser is an air diffuser.

11. The method of claim 7 further comprising a plurality of pneumatic streams.

12. The method of claim 7 wherein said pneumatic cleaning air supply is supplied by said pneumatic air supply.

13. A powder coating apparatus comprising:

a pneumatic source for providing a pneumatic supply;

a block manifold that distributes the pneumatic supply;

an electrostatic spray gun for applying a paint in powder form; and a pneumatic diffuser connected to said electrostatic spray gun with a beveled annular ring, the pneumatic diffuser receiving said pneumatic supply from said pneumatic source and directing a pneumatic stream at the electrostatic spray gun.

14. The powder coating apparatus of claim 13 further comprising a processor that controls the distribution of said pneumatic supply to said electrostatic spray gun and said pneumatic diffuser.

15. The powder coating apparatus of claim 13 further comprising a volume booster that receives said pneumatic supply from said block manifold and increases the pneumatic flow rate provided to said pneumatic diffuser.

16. The apparatus of claim 13 wherein a plurality of pneumatic diffusers receive said pneumatic supply and direct a plurality of streams substantially toward said electrostatic spray gun.

17. The apparatus of claim 13 wherein said controller is a programmable logic controller.

18. An apparatus for reducing powder accumulation on an electrostatic powder coating device comprising:

an annular ring coupled about said electrostatic powder coating device;

a plurality of pneumatic diffusers coupled to said annular ring at spaced apart locations and at an angle relative to said electrostatic powder coating device; and a pneumatic distribution device coupled to said plurality of pneumatic diffusers for distributing a pneumatic supply to said plurality of pneumatic diffusers for directing pneumatic streams at said electrostatic powder coating device.

19. The apparatus of claim 18, wherein said pneumatic distribution device further comprises a tubular ring interconnecting a pneumatic source and said plurality of pneumatic diffusers.

20. A method of reducing powder accumulation on a pneumatic electrostatic powder coating device comprising the steps of:

connecting an annular ring to said electrostatic powder coating device;

connecting a plurality of pneumatic diffusers to said annular ring at spaced apart locations and at an angle relative to said pneumatic electrostatic powder coating device;

connecting a pneumatic distribution device to said plurality of pneumatic diffusers;

connecting a pneumatic source to said pneumatic distribution device;

delivering a pneumatic supply from said pneumatic source to said pneumatic distribution device;

distributing said pneumatic supply among said plurality of pneumatic diffusers; and directing pneumatic streams from said plurality of pneumatic diffusers at said pneumatic electrostatic powder coating device.

* * * * *